United States Patent
Gomes et al.

(10) Patent No.: US 12,267,442 B2
(45) Date of Patent: Apr. 1, 2025

(54) ESTABLISHING TRUST BETWEEN SUPERVISORS IN A NETWORK DEVICE

(71) Applicant: Arista Networks, Inc., Santa Clara, CA (US)

(72) Inventors: Julien André Alexis Gomes, Vancouver (CA); Baptiste Elie Franck Covolato, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 323 days.

(21) Appl. No.: 17/869,225

(22) Filed: Jul. 20, 2022

(65) Prior Publication Data

US 2024/0031174 A1 Jan. 25, 2024

(51) Int. Cl.
*H04L 29/00* (2006.01)
*H04L 9/08* (2006.01)
*H04L 9/32* (2006.01)

(52) U.S. Cl.
CPC .......... *H04L 9/3268* (2013.01); *H04L 9/0825* (2013.01); *H04L 9/3247* (2013.01)

(58) Field of Classification Search
CPC .............. H04L 9/3268; H04L 9/0825; H04L 9/3247; H04L 9/0897; H04L 9/3234; H04L 9/40; H04L 2209/127; G06F 21/57
See application file for complete search history.

(56) References Cited

U.S. PATENT DOCUMENTS

| | | | | |
|---|---|---|---|---|
| 7,318,235 | B2 * | 1/2008 | Grawrock | G06Q 20/367 380/278 |
| 7,571,312 | B2 * | 8/2009 | Scarlata | G06F 21/53 713/180 |
| 7,587,595 | B2 * | 9/2009 | Scarlata | G06F 21/74 713/193 |
| 7,613,921 | B2 * | 11/2009 | Scaralata | G06F 9/45533 380/280 |
| 7,636,442 | B2 * | 12/2009 | Scarlata | G06F 21/577 380/283 |
| 8,074,262 | B2 * | 12/2011 | Scarlata | H04L 63/0823 726/4 |
| 8,832,452 | B2 * | 9/2014 | Johnson | G06F 21/71 713/193 |
| 9,230,109 | B2 * | 1/2016 | Wooten | H04L 9/0836 |

(Continued)

FOREIGN PATENT DOCUMENTS

| | | | | |
|---|---|---|---|---|
| CN | 101960464 A | * | 1/2011 | ........... G06F 21/575 |
| WO | 2021073376 A1 | | 4/2021 | |

OTHER PUBLICATIONS

Trusted Computing Group, "TCG: Trusted Computing Architecture", CS 155; spring 2010 (37 pages).

*Primary Examiner* — Don G Zhao
(74) *Attorney, Agent, or Firm* — Tianyi He

(57) ABSTRACT

In general, embodiments relate to a method for establishing trust between supervisors in a network device, the method including obtaining, by a first supervisor, signed platform configuration register (PCR) values from a second supervisor, wherein the first supervisor and the second supervisor are located in the network device, comparing the signed PCR values with stored PCR values, where the stored PCR values were previously obtained by the first supervisor from the second supervisor, and establishing, based on the comparison, trust with the second supervisor.

20 Claims, 8 Drawing Sheets

(56) References Cited

U.S. PATENT DOCUMENTS

| | | | |
|---|---|---|---|
| 9,501,801 B2 | 11/2016 | Wong et al. | |
| 9,906,493 B1 | 2/2018 | Rodgers et al. | |
| 9,953,143 B2 | 4/2018 | Yee et al. | |
| 10,218,696 B2* | 2/2019 | Thom | H04L 63/061 |
| 10,601,787 B2* | 3/2020 | Pritikin | H04W 4/02 |
| 10,735,190 B1* | 8/2020 | Khare | H04L 9/0877 |
| 11,122,346 B1* | 9/2021 | Kumar | H04L 63/0853 |
| 11,165,861 B2* | 11/2021 | Sheth | H04L 67/1001 |
| 11,316,869 B2* | 4/2022 | Hill | H04L 9/12 |
| 11,343,091 B2* | 5/2022 | Sheth | H04L 9/3247 |
| 2003/0037244 A1 | 2/2003 | Goodman et al. | |
| 2004/0019564 A1 | 1/2004 | Goldthwaite et al. | |
| 2005/0149722 A1* | 7/2005 | Wiseman | H04L 63/061 713/155 |
| 2005/0262571 A1* | 11/2005 | Zimmer | G06F 21/57 726/27 |
| 2006/0005009 A1 | 1/2006 | Ball et al. | |
| 2006/0256107 A1* | 11/2006 | Scarlata | G06F 21/53 345/418 |
| 2009/0086979 A1* | 4/2009 | Brutch | H04L 9/0836 380/279 |
| 2009/0089582 A1* | 4/2009 | Brutch | H04L 9/0897 713/171 |
| 2009/0150899 A1* | 6/2009 | Tahan | G06F 21/57 718/106 |
| 2009/0292919 A1* | 11/2009 | England | H04L 9/3263 713/168 |
| 2010/0082987 A1* | 4/2010 | Thom | G06F 21/34 713/171 |
| 2010/0088499 A1* | 4/2010 | Zimmer | G06F 21/10 713/193 |
| 2011/0099627 A1* | 4/2011 | Proudler | G06F 21/57 711/E12.001 |
| 2013/0211874 A1 | 8/2013 | Wu et al. | |
| 2013/0339729 A1* | 12/2013 | Novak | G06F 21/57 713/167 |
| 2014/0040890 A1* | 2/2014 | Novak | G06F 21/53 718/1 |
| 2015/0072726 A1* | 3/2015 | Stern | H04W 12/086 455/552.1 |
| 2015/0074745 A1* | 3/2015 | Stern | G06F 21/57 726/1 |
| 2015/0074764 A1* | 3/2015 | Stern | H04L 63/06 726/4 |
| 2016/0085969 A1* | 3/2016 | Wiseman | G06F 9/4401 713/2 |
| 2016/0241701 A1 | 8/2016 | Gray et al. | |
| 2017/0039352 A1* | 2/2017 | Volkening | G06F 21/57 |
| 2017/0075699 A1* | 3/2017 | Narayanan | H04L 9/14 |
| 2017/0093800 A1* | 3/2017 | Wiseman | H04L 63/0853 |
| 2017/0155513 A1 | 6/2017 | Acar et al. | |
| 2017/0295195 A1* | 10/2017 | Wettstein | H04L 63/1425 |
| 2017/0302459 A1* | 10/2017 | Fenner | H04L 9/3234 |
| 2018/0007040 A1* | 1/2018 | Thom | G06F 21/575 |
| 2018/0288101 A1* | 10/2018 | Sharma | H04L 9/3236 |
| 2019/0163597 A1 | 5/2019 | Shibamura | |
| 2019/0182044 A1 | 6/2019 | Mullen et al. | |
| 2020/0014691 A1* | 1/2020 | Ortiz | H04L 9/0894 |
| 2020/0162318 A1 | 5/2020 | Patil et al. | |
| 2020/0186365 A1* | 6/2020 | Kumar | H04L 9/3263 |
| 2021/0120412 A1 | 4/2021 | Bruner et al. | |
| 2021/0152353 A1 | 5/2021 | Canillas et al. | |
| 2021/0297259 A1 | 9/2021 | Rahn et al. | |
| 2021/0297409 A1 | 9/2021 | Rahn et al. | |
| 2022/0131686 A1* | 4/2022 | Chhodavdia | H04L 9/0844 |
| 2022/0141026 A1* | 5/2022 | Smith | H04L 9/0891 713/181 |

* cited by examiner

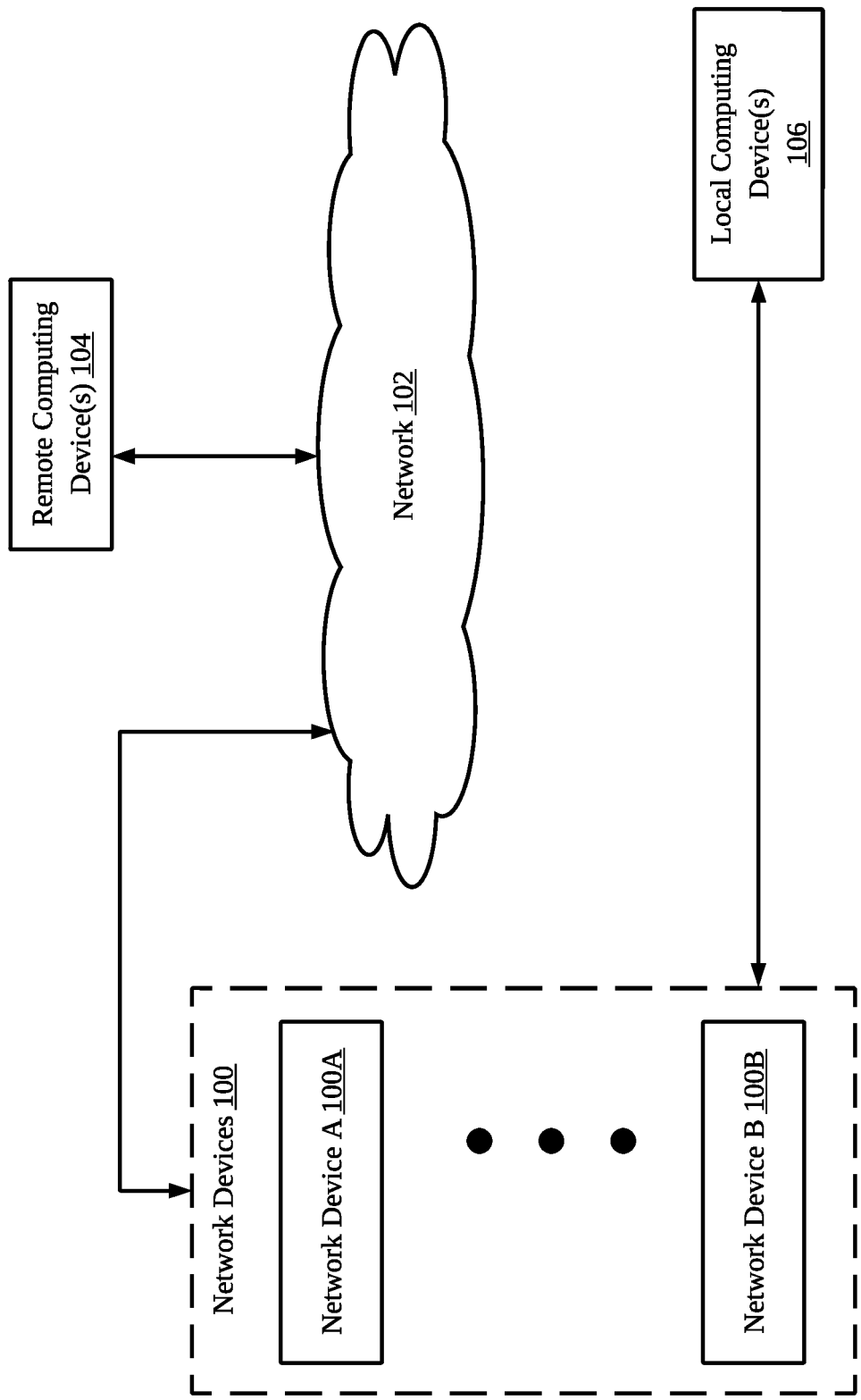
FIG. 1.1

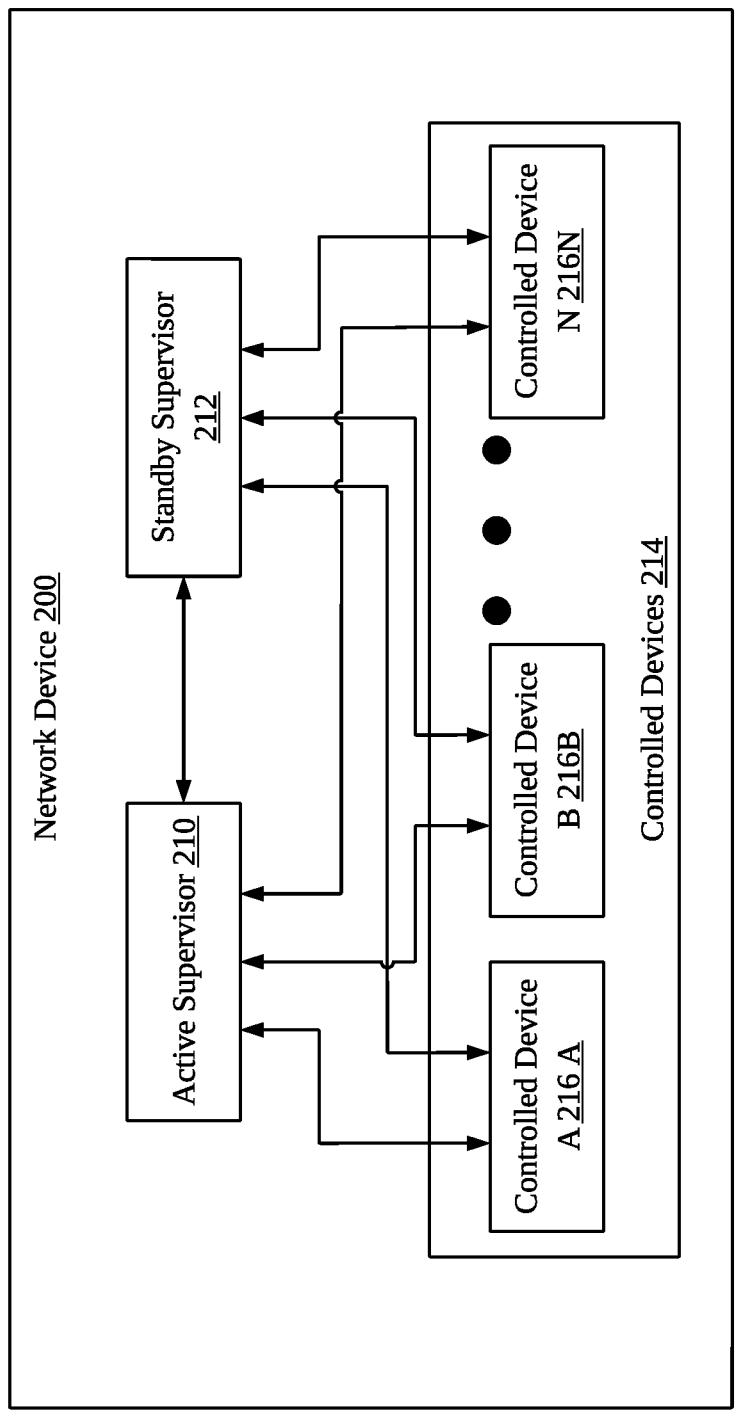
FIG. 1.2

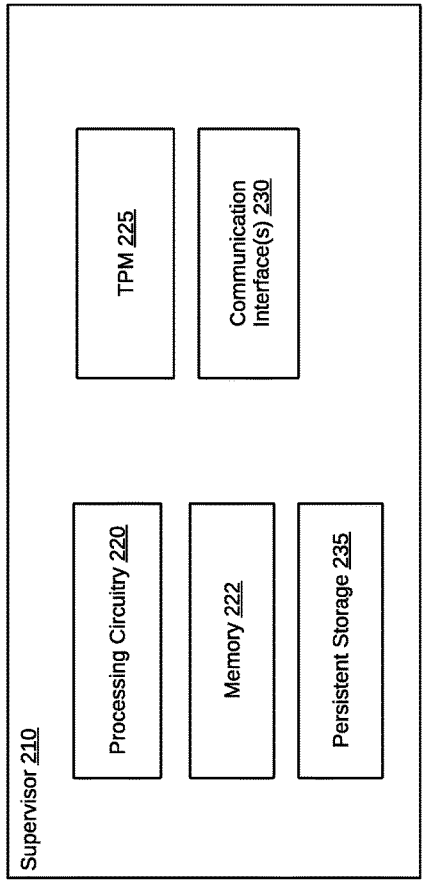
FIG. 2.1
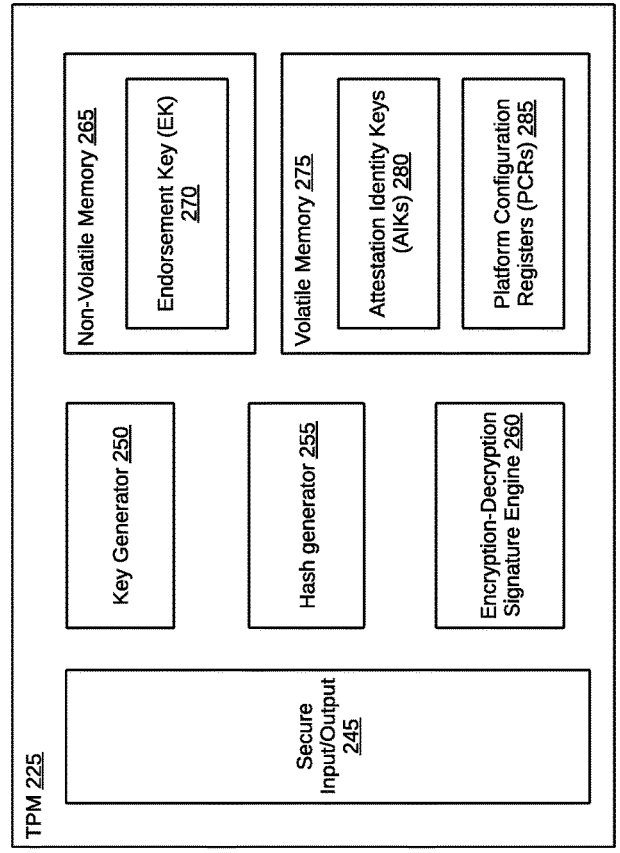
FIG. 2.2

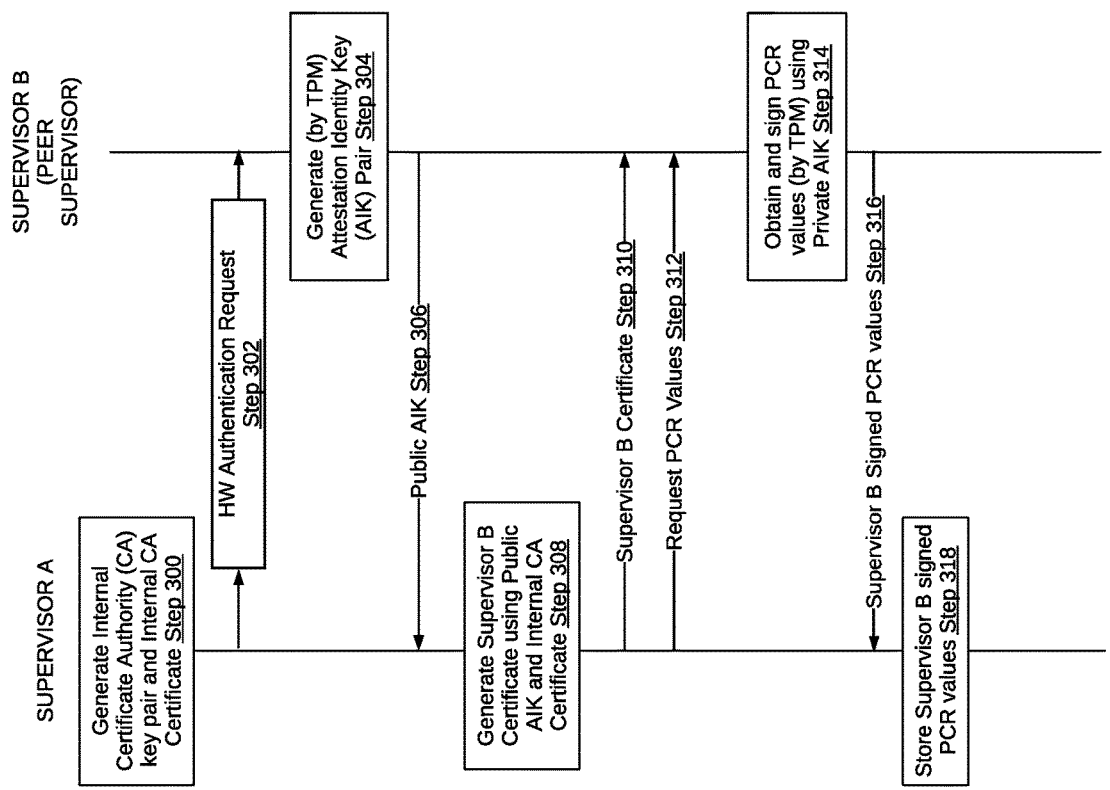
FIG. 3.1

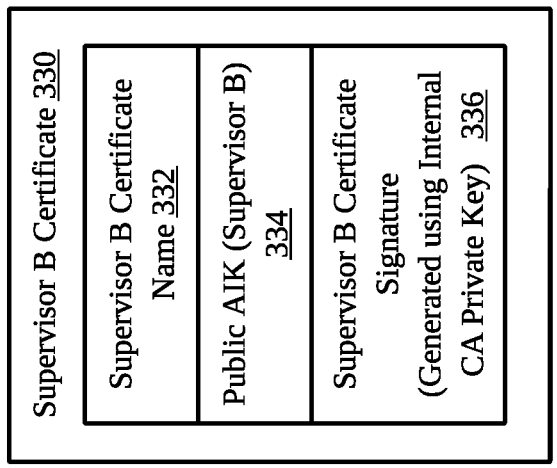
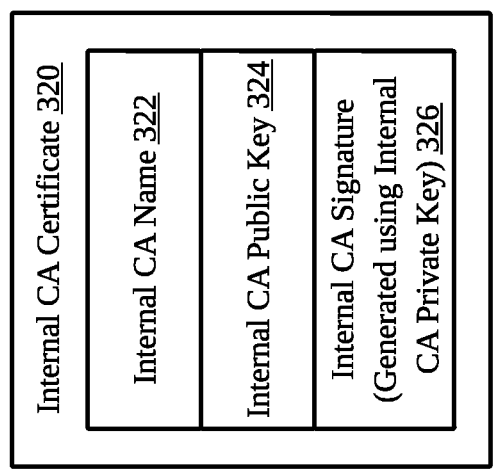
FIG. 3.2

ESTABLISHING TRUST BETWEEN SUPERVISORS IN A NETWORK DEVICE

BACKGROUND

Information technology (IT) networks may include computing devices (e.g., servers, databases, etc.) and network devices (e.g., routers, switches, etc.). The network devices enable the computing devices to communicate with each other as well as communicate with other computing devices connected via wide area networks (e.g., the Internet).

BRIEF DESCRIPTION OF DRAWINGS

Certain embodiments of the disclosure will be described with reference to the accompanying drawings. However, the accompanying drawings illustrate only certain aspects or implementations of the disclosure by way of example, and the accompanying drawings are not meant to limit the scope of the claims.

FIG. 1.1 shows an example of a system in accordance with one or more embodiments disclosed herein.

FIG. 1.2 shows an example of a network device in accordance with one or more embodiments disclosed herein.

FIG. 2.1 shows an example of a supervisor in accordance with one or more embodiments disclosed herein.

FIG. 2.2 shows an example of a Trusted Platform Module (TPM) in accordance with one or more embodiments herein.

FIG. 3.1 shows a flow chart for an initial setup in accordance with one or more embodiments disclosed herein.

FIG. 3.2 shows an example of certificates in accordance with one or more embodiments disclosed herein.

DETAILED DESCRIPTION

Figure 4:
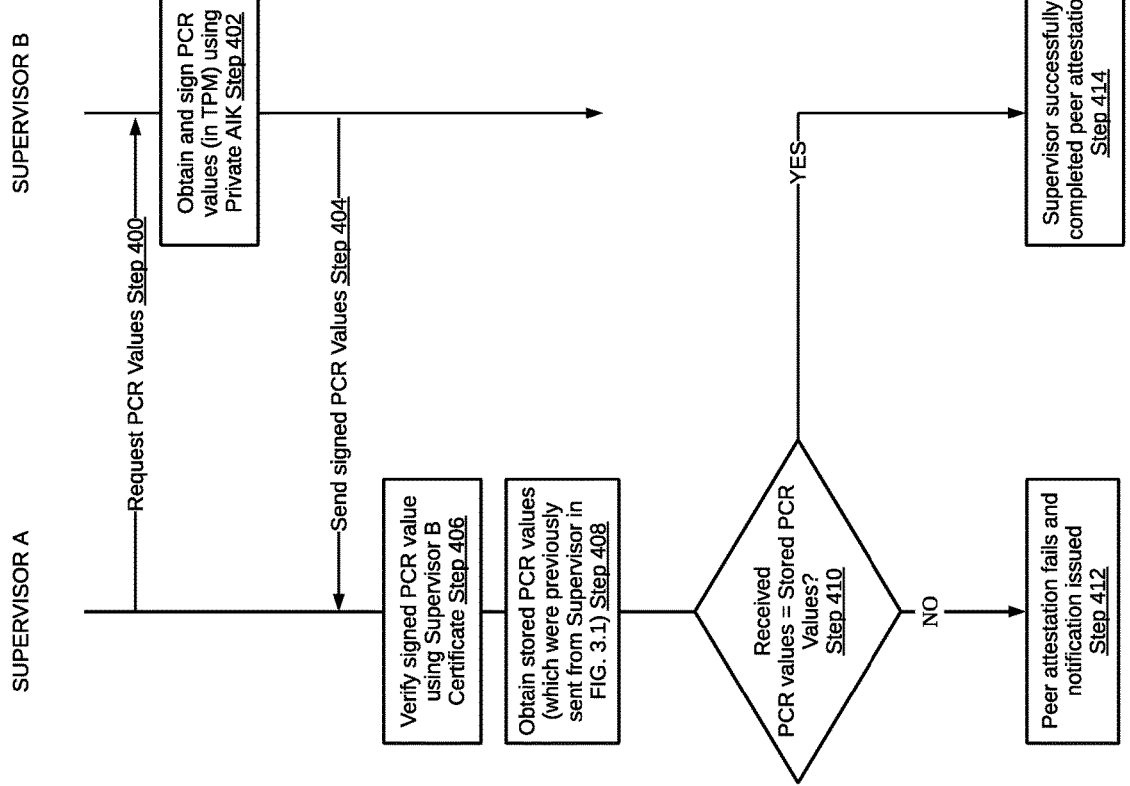
FIG. 4 shows a flow chart for establishing trust in accordance with embodiments disclosed herein.

Network devices may include two (or more) supervisors. Supervisors (as additionally described below) handle the operation of the network device. Currently, a supervisor of a network device may trust other installed supervisors by default based on the standard configuration of the network device. That is, there may be an implied trust between supervisors that are installed within a network device. This can lead to security issues, e.g., when a first supervisor in a network device receives a secret (e.g., encryption keys from a third-party server) and then the first supervisor synchronizes this secret with a second supervisor. If the second supervisor has been compromised, then malicious third parties can access the secret via the second supervisor.

In general, embodiments of the disclosure are directed to establishing trust by the first supervisor in a network device with the second supervisor in the network device (and vice versa). Embodiments use platform configuration registers (PCRs) of a Trusted Platform Module (TPM) in combination with attestation identity keys (AIKs) and internal certificate authority (CA) certificates to establish such trust. Embodiments have the advantage of preventing a supervisor from sharing configuration or data with an unknown or potentially malicious peer supervisor (i.e., a peer that it does not trust). Embodiments also provide an additional layer of security in networked devices.

In embodiments disclosed herein, with the initialization or recovery of a supervisor, one or more peer supervisors may be considered not trusted. Embodiments use a selection of PCR values from a peer supervisor to verify the PCR values. If the verification is successful, a supervisor may deem the peer supervisor as "trusted". See e.g., FIGS. 3.1 and 4.

In the event that a supervisor is deemed to be "lost" for example, due to a reboot, removal, crash, etc., its peer supervisor (i.e., the other supervisor in the network device) can reestablish trust with the supervisor in accordance with embodiments disclosed herein. See e.g., FIG. 5.

Specific embodiments will now be described with reference to the accompanying figures.

FIG. 1.1 shows an example of a system in accordance with one or more embodiments disclosed herein. In embodiments disclosed herein, the system includes network devices (100). The network devices (100) may be accessed and/or managed by one or more remote computing devices (104). The network devices (100) may also be accessed and/or managed via one or more local computing devices (106). Each of these components is described below.

The remote computing devices(s) (104) may communicate with the network devices (100) over a network (102). The network (102) includes functionality to facilitate communications between these aforementioned components using any known or later discovered networking protocol. The network (102) may include any combination of local area network (LAN) and/or wide area network (WAN) segments, such as the Internet, which may employ any combination of wired and/or wireless connections and communication protocols.

In one or more embodiments of the disclosure, each network device (100) is a physical device that includes persistent storage, memory (e.g., random access memory), one or more processor(s) (including a switch chip), and two or more physical ports. In one or more embodiments of the disclosure, the switch chip is a physical device that determines which egress port on a network device to forward media access control (MAC) frames. The switch chip may include egress and ingress ports that may connect to ports on the network device. Each port may or may not be connected to another device (e.g., a server, a switch, a router, etc.). The network device may be configured to receive packets via the ports and determine whether to: (i) drop the packet; (ii) process the packet in accordance with one or more embodiments of the disclosure; and/or (iii) send the packet, based on the processing, out another port on the network device. Examples of network devices include routers, switches, and multi-layer switches.

The network device(s) (100) includes functionality to allow remote computing devices (104) to communicate with the local computing devices (106). Additional detail about network devices is provided below in FIG. 1.2.

In one or more embodiments of the disclosure, each local computing device(s) (106) and/or remote computing device(s) (104) may be implemented as a computing device. In one or more embodiments of the disclosure, a computing device is any device or any set of devices capable of electronically processing instructions and may include, but is not limited to, any of the following: one or more processors, memory (e.g., random access memory (RAM)), input and output device(s), persistent storage, one or more physical interfaces (e.g., network ports), any number of other hardware components (not shown) (e.g., light emitting diodes (LEDs), optical transceivers, network chips, etc.) or any combination thereof. Examples of computing devices include, but are not limited to, a server (e.g., a blade-server in a blade-server chassis, a rack server in a rack, etc.), a desktop computer, a mobile device (e.g., laptop computer) and/or any other type of computing device with the aforementioned requirements. Additional detail about computing devices is provided in FIG. 6 below.

Those skilled in the art will appreciate that the disclosure is not limited to the system shown in FIG. 1.1.

FIG. 1.2 shows an example of a network device (200) in accordance with one or more embodiments disclosed herein. The network device (200) includes an active supervisor (210), a standby supervisor (212), and controlled devices (214). The other components of the network device (e.g., as described with respect to FIG. 1.1. are not shown).

Continuing with the discussion of FIG. 1.2, as shown in FIG. 1.2, the controlled devices (214) include controlled device A (216A), controlled device B (216B), and controlled device N (216N). Each of these components is described below.

In one or more embodiments of the disclosure, a supervisor (e.g., active supervisor (210), standby supervisor (212)) is any hardware (e.g., circuitry), software, firmware, and/or combination thereof that includes functionality to receive information (e.g., from controlled devices (214)) and/or perform one or more actions related to the controlled devices. The supervisor may include functionality to receive, organize, interpret, store, and/or take one or more actions in response to information regarding devices (e.g., controlled devices (214)) to which it is connected. Further, the supervisor may also be able to send commands to any device to which it is connected.

Examples of the supervisor include, but are not limited to, software, a System Control Device (SCD), any one or more integrated circuits (ICs), a field programmable gate array (FPGA), an application specific integrated circuit (ASIC), a microcontroller, any device capable of being programmed with device logic and/or capable of executing instructions for performing various operations, and/or any combinations thereof.

Additionally, as shown in FIG. 1.2, each supervisor (210, 212) may connect independently to each controlled device (216A, 216B, 216N). Further, the active supervisor (210) and the standby supervisor (212) may be connected to each other. The connections between each supervisor (210, 212) and each controlled device (216A, 216B, 216N) may occur over a single wire, any multiple of wires, and/or wirelessly. One of ordinary skill in the art and having the benefit of this disclosure would appreciate that any form of suitable communication between the supervisors (210, 212) and the controlled devices (216A, 216B, 216N) may be employed. Further, each supervisor (210,212) may not be connected to each controlled device (216A, 216B, 216N) independently; rather, the supervisors (210, 212) may share connections between each controlled device (216A, 216B, 216N). Additionally, certain controlled devices (216A, 216B, 216N) may be connected to only one supervisor (e.g., active supervisor (210)), while other controlled devices (216A, 216B, 216N) may be connected to another supervisor (e.g., standby supervisor (212)).

In one or more embodiments, the active supervisor (210) and the standby supervisor (212) are connected to enable communication between the two supervisors (210, 212). Further, as each supervisor (210, 212) may be independently connected to each controlled device (216A, 216B, 216N), each supervisor (210, 212) may independently collect data from each controlled device (216A, 216B, 216N). Therefore, for example, if the communication between the active supervisor (210) and any one particular controlled device (216A, 216B, 216N) becomes severed (or the data transmitted therein becomes otherwise unreadable) the active supervisor (210) may then be able to query the standby supervisor (212) to obtain that missing or corrupt data. Conversely, the standby supervisor (212) may be able to query the active supervisor (210) to obtain any data that is missing, unavailable, or otherwise corrupt.

In one or more embodiments, the active supervisor (210) may manage the operation of the controlled devices (214) while in an active mode. In contemporary operations, at least one of the two supervisors (210, 212) is to perform the role of active supervisor. Further, in contemporary operations, only one of the supervisors may perform the operation of the active supervisors. Without departing from the disclosure, any number of supervisors may perform the operations of the active supervisor without departing from the disclosure. Additional detail about supervisors is provided in FIG. 2.1.

In one or more embodiments of the disclosure, a controlled device (e.g., 216A, 216B, 216N) is any hardware (e.g., circuitry) and/or combination of hardware and software that includes functionality to perform all or any portion of any functionality of the network device (200). In one or more embodiments of the disclosure, a controlled device (e.g., 216A, 216B, 216N) is included in a computing device and/or may be connected to a computing device. Non-limiting examples of controlled devices are included below.

In one or more embodiments of the disclosure, a controlled device (e.g., 216A, 216B, 216N) is any single device, any component of a device, any aggregate of devices, any aggregate of components of a device, or any aggregate of components of multiple devices. Thus, as used herein, multiple devices and/or components may collectively be termed a "controlled device".

Examples of a controlled device (e.g., 216A, 216B, 216N) include, but are not limited to, a switch, a line card, a fabric card, an individual port on line card, a central processing unit (CPU), a system control device (SCD), a supervisor (described below), a power supply unit (PSU), a network chip, a router, an access point, a computing device, a fan, an optical transceiver, a light emanating device (e.g., a LED), a Power Over Ethernet (POE) port and/or device, any multiple of these devices, or any other device(s) that may be powered by a PSU. As another example, a controlled device (e.g., 216A, 216B, 216N) may be an aggregation of multiple components of two or more devices (e.g., various display indicator LEDs of multiple devices). Further, an SCD may be a device that interacts with software (e.g., agents) and provides the ability to control any type of component of the system.

While FIG. 1.2 shows a configuration of components, other configurations may be used without departing from the scope of the disclosure. For example, although controlled devices (214) are shown with only three distinct devices (i.e., 216A, 216B, 216N), one of ordinary skill in the art and having the benefit of this disclosure would appreciate that there can be any number of controlled devices in the disclosed system. As another example, although FIG. 1.2 shows an active supervisor (210) and a standby supervisor (212), there may be more than two supervisors in the network device. Accordingly, embodiments disclosed herein should not be limited to the configuration of components shown in FIGS. 1.1 and 1.2.

FIG. 2.1 shows an example of a supervisor in accordance with one or more embodiments disclosed herein. The supervisor (210) includes processing circuitry (220), memory (222), persistent storage (235), a TPM (225), and a communication interface(s) (230). Each of these components is described below.

The processing circuitry (220) in combination with computer readable instructions stored in the persistent storage (235) may be used to implement all or a portion of the functionality described in FIGS. 3.1-5. The computer readable instructions may be distributed by a trusted source (e.g., a network server associated with the network device manufacturer and/or distributor). The aforementioned processing may be facilitated by the memory (222)(e.g., non-persistent storage), which may temporarily store data that is used by the processing circuitry (220) when performing all or a portion of the functionality described in FIGS. 3.1-5. The communication interface(s) (230) enables the supervisor to communicate with other components within and/or external to the network device in which it is located.

The trusted platform module (TPM) (225) (also referred to as a hardware security device) may include a cryptographic processor, a secure input/output (IO) interface (to enable communication with other components in the network device), and persistent memory (which may store various certificates and various cryptographic keys, e.g., public keys). In one or more embodiments, the cryptographic processor may include functionality to encrypt and decrypt data using the cryptographic keys (e.g., a numeric, alpha, or alphanumeric value) and generate hash values (e.g., using a hash function). The hardware security device may be implemented in a manner that conforms to one or more Trusted Computing Group Trusted Platform Module specifications.

The TPM (225) may be programmed during the manufacturing process of the network device. The programming includes loading the appropriate certificates and public keys (which may be included within the certificates) into the TPM. The certificates and public keys loaded into the TPM correspond to the certificates and public keys required to perform the functionality described in FIGS. 3.1-5. The TPM may also include functionality to perform at least a portion of the functionality described in FIGS. 3.1-5. Additional detail about the TPM (225) is provided in FIG. 2.2.

FIG. 2.2 shows an example of a Trusted Platform Module (TPM) (225) in accordance with one or more embodiments herein. The TPM (225) includes a key generator (250), which may be used to generate an attestation identity key (AIK) (280) (e.g., a public/private encryption key pair). The AIK (280) may be stored in a volatile memory (275) of the TPM (225). The volatile memory (275) includes platform configuration registers (PCRs) (285). The PCRs are locations in the memory (275) that are used to record the state of the hardware and/or software executing on the network device and/or the configuration data used by the network device. For example, the TPM may include 24 PCRs, where specific registers of the PCRs store information about the basic input/out system (BIOS), BIOS configuration, firmware, power state events, boot events, etc. The PCR values may correspond to the actual measurements of the state of a hardware and/or software component in the network device or the PCR values may correspond to hash values generated (e.g., by the hash generator (225)) based on the aforementioned actual measurements.

The TPM also includes a non-volatile memory (265) that may store various items, such as, an endorsement key (270), which is required for the operation of the TPM. The TPM (225) also includes a hash generator (255) (e.g., a SHA hash generator) for generating and/or validating signed values (described below) and an encryption-decryption signature engine (260), which may be used to encrypt/decrypt data based upon a AIK (280) or other AIKs. Such components of TPM (225) may be used to perform various attestation functions such as described herein. Such components may be accessed through use of the TPM (225)'s application programming interface (API). Embodiments disclosed herein are not limited to the components shown in FIG. 2.2.

The processing circuitry (220) of the supervisor (210) may be connected to a secure input/output (I/O) (245) through which TPM API calls and output may be directed.

One skilled in the art will recognize that the architecture of a network device and the TPM is not limited to the components shown in FIGS. 2.1-2.2. For example, the network device may include additional processors and/or memory not shown in FIGS. 2.1-2.2.

The following discussion of FIGS. 3.1-5 describes the setup and use of the PCR values to perform supervisor-supervisor attestation for at least two supervisors located in a network device. The steps shown in FIGS. 3.1-5 may be performed at any time (and repeated, as discussed below) during the operation of the network device. While FIGS. 3.1-5 describe attestation of one supervisor with respect to a second supervisor, each supervisor in a given network device may perform FIGS. 3.1-5 with respect to every other supervisor in the network device. Said another way, FIGS. 3.1-5 describe methods for Supervisor A to establish trust with Supervisor B; however, the same methods may be used to allow Supervisor B to establish trust with Supervisor A. As each supervisor may perform the following methods to establish trust with one or more other supervisors, there may be scenarios, e.g., in which Supervisor A establishes trust with Supervisor B but Supervisor B fails to establish trust with Supervisor A.

FIG. 3.1 shows a flow chart for an initial setup in accordance with one or more embodiments disclosed herein. FIG. 3.1 describes an initial setup for Supervisor A to obtain PCR values from a peer Supervisor B in order for Supervisor A to establish trust with Supervisor B. The method of FIG. 3.1 utilizes certificates as shown in the examples of FIG. 3.2 (which are described below).

In Step 300, Supervisor A generates an internal Certificate Authority (CA) key pair and an internal CA certificate. The internal CA key pair is generated in Supervisor A but may be generated outside of its TPM. For example, the internal CA key pair is generated by the processing circuitry (220). The generation of the internal CA certificate may be performed using the processing circuitry and/or the TPM (225). Referring to FIG. 3.2, the internal CA certificate (320) includes an internal CA name (322), the internal CA public key (324), and an internal CA signature (326). The internal CA name (322) is an identifier that is used to distinguish the internal CA certificate from other certificates used by Supervisor A and Supervisor B.

The internal CA signature may be created by hashing the internal CA name and the internal CA public key to generate a hash value and then encrypting the hash value using the internal CA private key. The internal CA certificate is then stored in Supervisor A, e.g., in the memory (222) and/or the persistent storage (235).

In Step 302, a hardware (HW) authentication request is sent to Supervisor B. In response to the request, in step 304, Supervisor B generates an Attestation Identity Key (AIK) pair, which includes a public AIK and a corresponding private AIK. More specifically, the TPM of Supervisor B may generate the AIK pair. If the AIK pair was previously generated, step 304 may not be performed. In step 306, Supervisor B sends the public AIK to Supervisor A. Supervisor A subsequently stores (e.g., in the memory (222) and/or the persistent storage (235)) the public AIK from Supervisor B.

In step 308, Supervisor A generates a certificate (i.e., Supervisor B Certificate) for Supervisor B that includes the Supervisor B Certificate Name (332), the public AIK received from Supervisor B in step 306 (334), and a Supervisor B Certificate Signature (336). An example of a Supervisor B Certificate is shown in FIG. 3.2.

Referring to FIG. 3.2, the Supervisor B Certificate Name (332) is an identifier that is used to distinguish the Supervisor B Certificate (330) from other certificates used by Supervisor A and Supervisor B.

The Supervisor B Certificate Signature may be created by hashing the Supervisor B Certificate Name and the public AIK to generate a hash value and then encrypting the hash value using the internal CA private key. The Supervisor B Certificate is then stored in Supervisor A, e.g., in the memory (222) and/or the persistent storage (235).

In step 310, the Supervisor B Certificate is sent to Supervisor B. In Step 312, Supervisor A requests PCR value(s). The request may specify one or more PCR values (which may be all or a subset of all available PCR values) to be sent to Supervisor A. In step 314, in response to receiving the Supervisor B Certificate, Supervisor B obtains the appropriate PCR values (i.e., the PCR value(s) that were requested in the HW authentication request) and signs the PCR values using the private AIK of Supervisor B. In one or more embodiments, the PCR values may be signed in the TPM of Supervisor B. This may ensure that the private AIK is stored and maintained solely in the TPM. In step 316, the PCR values signed by Supervisor B are sent to Supervisor A. In step 318, Supervisor A verifies that the PCR values are properly signed by Supervisor B, using the public AIK received in Step 306) and, if properly signed, stores the PCR values. The determination that the PCR values are properly signed may be performed using any known or later discovered mechanism for verifying digital signatures. The PCR values may be stored in the TPM, in the memory (222) or in the persistent storage (235).

At this stage, the Supervisor A has obtained signed PCR values from Supervisor B. These correspond to the initial PCR values obtained from Supervisor B and serve to establish a "baseline" state of Supervisor B. As is discussed below, Supervisor A uses this baseline state in order to determine whether Supervisor B has been modified.

FIG. 4 shows a flow chart for establishing trust between peer supervisors in accordance with embodiments disclosed herein. After the initial setup demonstrated by the embodiments of FIGS. 3.1-3.2, peer authentication between a Supervisor A and a Supervisor B may be achieved using PCR values in accordance with the one or more embodiments described in FIG. 4.

In step 400, a request for PCR values of Supervisor B is sent to Supervisor B from Supervisor A. The request may specify one or more PCR values (which may be all or a subset of all available PCR values) to be sent to Supervisor A. In response, in step 402, the PCR values are obtained from the TPM in Supervisor B and signed by Supervisor B using the private AIK of Supervisor B. The signing of the PCR values is performed in the TPM of Supervisor B. In another embodiment, the PCR values may be signed by another component (e.g., processing circuitry, 220 in FIG. 21) in Supervisor B, where such a component is outside of the TPM. Step 400 initiates the attestation process of supervisor B by supervisor A.

In step 404, the signed PCR values are sent to Supervisor A. In step 406, Supervisor A verifies the received PCR values using the stored Supervisor B Certificate. More specifically, Supervisor A uses the public AIK from the Supervisor B Certificate in order to verify that Supervisor B properly signed the PCR values. The determination that the PCR values are properly signed may be performed using any known or later discovered mechanism for verifying digital signatures.

In step 408, when the PCR values from Supervisor B are properly signed, Supervisor A obtains the stored PCR values (i.e., the PCR values obtained in 314 or step 516 (described below)). In Step 410, the received PCR values are compared to the stored PCR values to determine whether they match. If the received PCR values do not match the stored PCR values, the trust establishment is deemed to have failed (i.e., Supervisor A has determined that there is an unexpected change in Supervisor B based on the mismatching PCR values) and, as such, a notification (e.g., an email, SMS, GUI prompt, recording an entry in a log file, etc.) indicating the failure may be issued to an administrator of the network device in step 412. If the received PCR values match the stored PCR values, then in Step 414, the attestation is deemed to be successful and, as such, Supervisor A "trusts" Supervisor B. Said another way, the stored PCR values correspond to a baseline state of Supervisor B and Supervisor A deems this state to be a known valid state. If Supervisor B, via FIG. 4, is able to attest that its state has not changed, then Supervisor A can "trust" that Supervisor B.

The trust establishment described in FIGS. 3.1-4 may be instigated by a command issued by an administrator of a network device or by the powering on of a network device in accordance with the embodiments disclosed herein.

Figure 5:
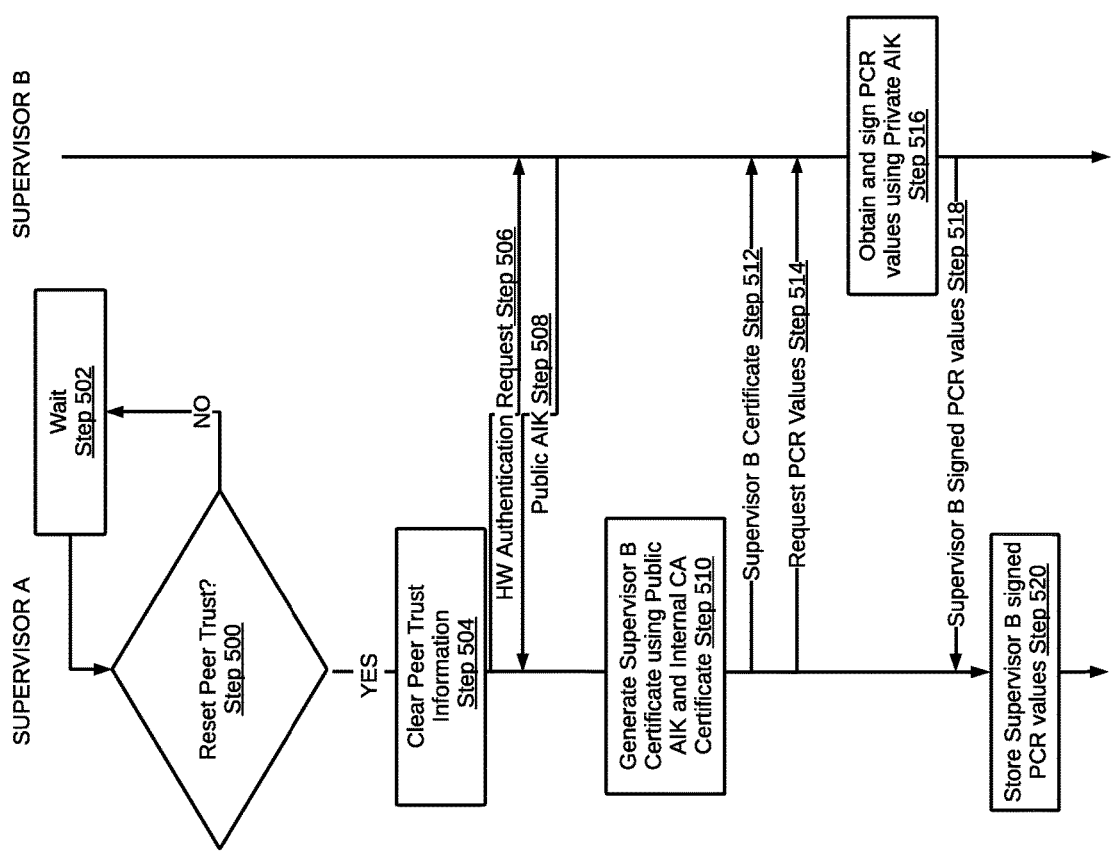
FIG. 5 shows a flow chart for resetting peer trust in accordance with embodiments disclosed herein.

FIG. 5 shows a flow chart for resetting peer trust (also referred to as resetting trust) (i.e., trust between a first supervisor and a second supervisor) in accordance with embodiments disclosed herein. In step 500, it is determined if the peer trust between Supervisor A and Supervisor B is to be reset. If the peer trust is not reset, Supervisor A may wait as shown in step 502. The determination made in step 500 may be instigated by a command or may be the result of conditions detected in the network device. For example, trust may need to be reestablished (or reset) between supervisors based on changes in configuration of the network device, upgrades to network device (or components therein), rebooting of the network device, power cycling of the network device, replacement of a component(s) (i.e., a hardware component(s) and/or a software component(s)) in the network device, etc.

If it is determined in step 500 to reset the peer trust, the current peer trust information is cleared from the Supervisor in step 504. In some embodiments, clearing the peer trust information includes deleting the peer Attestation Key certificate (i.e., the Supervisor B Certificate) from the Supervisor A. In other embodiments, clearing the trust information includes deleting the internal CA key pair, internal CA certificate, and the peer Attestation Key certificate. The remaining steps of FIG. 5 are presented using the former option, i.e., deleting the peer Attestation Key certificate. The steps of FIG. 5 may be adjusted accordingly based on which peer trust information is cleared in accordance with embodiments disclosed herein.

In Step 506, a HW authentication request is sent to Supervisor B. The HW authentication request may specify PCR values to be obtained in order to establish trust with Supervisor B. In response to the request, in step 508, Supervisor B sends the public AIK to Supervisor A.

In step 510, Supervisor A generates a certificate (i.e., the Supervisor B Certificate) for Supervisor B, as described in FIGS. 3.1-3.2. In step 512, the Supervisor B Certificate is sent to Supervisor B. In Step 514, Supervisor A requests PCR value(s). The request may specify one or more PCR values (which may be all or a subset of all available PCR values) to be sent to Supervisor A. In response to the request, Supervisor B obtains the appropriate PCR values and signs the PCR values using the private key of Supervisor B in step 516. In step 518, the PCR values signed by Supervisor B are sent to Supervisor A. In step 520, Supervisor A verifies that the PCR values are properly signed by Supervisor B and stores the PCR values. Steps 506-520 may be performed in the same or substantially the same manner as corresponding Steps 302, 306-318 in FIG. 3.1.

Once FIG. 5 has been performed, Supervisor A may initiate the method in FIG. 4 to reestablish "trust" with Supervisor B.

Figure 6:
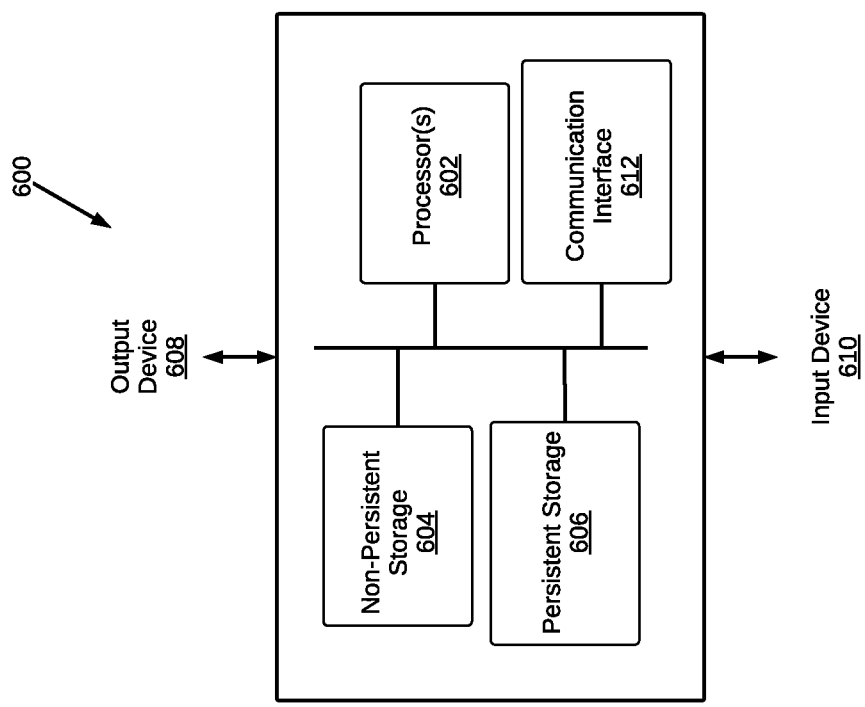
FIG. 6 shows a computing device in accordance with one or more embodiments disclosed herein.

As discussed above, embodiments of the disclosure may be implemented using computing devices. FIG. 6 shows a diagram of a computing device (600) in accordance with one or more embodiments of the disclosure. For example, a computing system (600) may be used as a local computing device (106), or remote computing device (104) shown in FIG. 1.1.

The computing device (600) is a physical device that may include one or more processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of the components illustrated in FIG. 6 is described below.

In one or more embodiments of the disclosure, the processor(s) (602) may be an integrated circuit for processing instructions. For example, the processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one or more embodiments of the disclosure, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the processor(s) (602), non-persistent storage (604), and persistent storage (606). Many different types of computing devices exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by processor(s), is configured to perform one or more embodiments of the disclosure. Embodiments of the software instructions may be written in various languages, for example, C, C++, Python, etc.

The advantages discussed above and throughout the detailed description should be understood as being examples associated with one or more problems being solved by embodiments of the disclosure. However, one or more embodiments of the disclosure disclosed herein should not be limited to solving the same/similar problems. The disclosed embodiments are broadly applicable to address a range of problems beyond those discussed herein.

In the above description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase 'connected' refers to any direct (e.g., wired directly between two devices) or indirect (e.g., wired and/or wireless connections between any number of devices connecting the connected devices) connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for establishing trust between first and second supervisors in a network device, the method comprising:

generating, by the first supervisor, an internal certificate authority (CA) private key;

receiving, by the first supervisor, a public attestation identity key (AIK) from the second supervisor;

generating, by the first supervisor, a certificate using the public AIK and the internal CA private key;

receiving, by the first supervisor, first signed platform configuration register (PCR) values from the second supervisor;

storing, by the first supervisor, the received first signed PCR values; and after storing the first signed PCR values:
sending, by the first supervisor, a PCR value request to the second supervisor;
receiving, by the first supervisor and in response to the PCR value request, second signed PCR values from the second supervisor; and
determining, by the first supervisor and based on comparing the stored first signed PCR values with the second signed PCR values, that trust is established between the first supervisor and the second supervisor.

2. The method of claim 1, further comprising:
after determining that trust is established:
sending a second PCR value request to the second supervisor;
receiving, in response to the second PCR value request, third signed PCR values from the second supervisor; and
determining, based on comparing the stored first signed PCR values with the third signed PCR values, that the stored first signed PCR values and the third signed PCR values do not match; and
in response to determining that the stored first signed PCR values and the third signed PCR values do not match, issuing a notification indicative of a failure of trust establishment.

3. The method of claim 1, further comprising:
after determining that trust is established:
determining that trust is to be reset;
in response to the determination:
deleting the stored first signed PCR values from the first supervisor; and
obtaining third signed PCR values from the second supervisor, wherein the third signed PCR values are used to reestablish trust by the first supervisor.

4. The method of claim 3, wherein trust is determined to be reset by determining that the network device has been rebooted, that the network device has been power cycled, that at least one hardware component in the network device has been replaced, or that at least one software component in the network device has been changed.

5. A method for establishing trust between first and second supervisors in a network device, the method comprising:
obtaining, by the first supervisor, signed platform configuration register (PCR) values from the second supervisor;
comparing, by the first supervisor, the signed PCR values with stored PCR values, wherein the stored PCR values were previously obtained by the first supervisor from the second supervisor; and
determining, by the first supervisor and based on the comparison, whether to establish trust with the second supervisor.

6. The method of claim 5, wherein the signed PCR values are generated by a trusted platform module (TPM) in the second supervisor and are signed using a private attestation identity key (AIK) stored in the TPM.

7. The method of claim 6, wherein the signed PCR values is a subset of all PCR values stored in the TPM.

8. The method of claim 5, further comprising:
prior to comparing the signed PCR values with the stored PCR values, verifying the signed PCR values using a second supervisor certificate, wherein the second supervisor certificate comprises a public AIK, wherein the public AIK is associated with the private AIK.

9. The method of claim 8, wherein the second supervisor certificate is generated by the first supervisor.

10. The method of claim 8, wherein the second supervisor certificate is signed using an internal certificate authority (CA) private key, wherein the internal CA private key is generated by the first supervisor.

11. The method of claim 8, wherein the stored PCR values are obtained by the first supervisor from the second supervisor at a first time, wherein the signed PCR values are obtained by the first supervisor from the second supervisor at a second time after the first time, and wherein the signed PCR values not matching the stored PCR values as a result of the comparison is indicative of an unexpected change in a state of the second supervisor between the first time and the second time.

12. The method of claim 8, wherein the public AIK is received from the second supervisor by the first supervisor.

13. A network device, comprising:
a plurality of controlled devices;
a first supervisor; and
a second supervisor connected to the first supervisor and comprising a trusted platform module (TPM), wherein at least one of the first supervisor or the second supervisor is configured to manage the plurality of controlled devices;
wherein the first supervisor is further configured to:
obtain, from the second supervisor, first signed platform configuration register (PCR) values generated by the TPM;
after obtaining the first signed PCR values, obtain, from the second supervisor, second signed PCR values generated by the TPM;
determine whether or not the second signed PCR values match the first signed PCR values; and
establish, based on the second signed PCR values matching the first signed PCR values, that the second supervisor is trusted.

14. The network device of claim 13, wherein the first supervisor is an active supervisor and the second supervisor is a standby supervisor.

15. The network device of claim 14, wherein the first supervisor is actively managing the plurality of controlled devices.

16. The network device of claim 13, wherein the first signed PCR values corresponding to a baseline state of the second supervisor and wherein the second signed PCR values matching the first signed PCR values is indicative of the baseline state of the second supervisor being unchanged.

17. The network device of claim 13, wherein the first signed PCR values correspond to a state of the second supervisor at a first time, wherein the second signed PCR values correspond to a state of the second supervisor at a second time, and wherein the first time is before the second time.

18. The network device of claim 13, wherein the second signed PCR values are signed by a private attestation identity key generated by the TPM.

19. The network device of claim 18, wherein the first supervisor is further configured to:
    verify the second signed PCR values using a public attestation identity key, wherein the public attestation identity key and the private attestation identity key form an attestation identity key pair.

20. The network device of claim 19, wherein the first supervisor stores the public attestation identity key in a certificate, wherein the certificate comprises a signature generated using an internal certificate authority (CA) private key, and wherein the internal CA private key is generated by the first supervisor.

* * * * *